United States Patent [19]
Breuer et al.

[11] 3,720,685
[45] March 13, 1973

[54] 3-AMINO-5-BENZYL-1,2,4-OXADIAZOLES

[75] Inventors: Hermann Breuer, Burgweinting; Ernst Schulze, Regensburg, both of Germany

[73] Assignee: E.R. Squibb & Sons, Inc., New York, N.Y.

[22] Filed: July 15, 1970

[21] Appl. No.: 55,253

[52] U.S. Cl. .......260/307 G, 260/558 R, 260/559 R, 424/272
[51] Int. Cl. .............................................C07d 85/52
[58] Field of Search...............................260/307 G

[56] References Cited

UNITED STATES PATENTS 3,564,606   2/1971   Breuer..................................260/307

OTHER PUBLICATIONS

Burger, "Medicinal Chemistry" Third Edition, Part II, Wiley–Interscience; page 964; 1970
Adams et al., C. A. 48, 8223i (1954)
Eloy et al., C. A. 71, 49862n (1969)

Primary Examiner—Alex Mazel
Assistant Examiner—R. V. Rush
Attorney—Lawrence S. Levinson, Merle J. Smith and Donald J. Perrella

[57] ABSTRACT

3-Amino-5-benzyl-1,2,4-oxadiazole and related compounds substituted on the α-carbon atom and/or on the phenyl ring are useful as antiinflammatory agents.

11 Claims, No Drawings

3-AMINO-5-BENZYL-1,2,4-OXADIAZOLES

SUMMARY OF THE INVENTION

This invention relates to new unsubstituted and substituted 3-amino-5-benzyl-1,2,4oxadiazoles of the formula

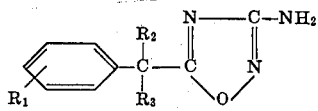

wherein $R_1$ is hydrogen, halogen, lower alkyl or lower alkoxy; $R_2$ is hydrogen, lower alkyl, cyclo-lower alkyl, phenyl, lower alkylphenyl, lower alkoxyphenyl, halophenyl or trifluoromethylphenyl; and $R_3$ is hydrogen, lower alkyl, phenyl, lower alkylphenyl, lower alkoxyphenyl or halophenyl.

The lower alkyl groups represented by the symbols, themselves or as part of a lower alkylphenyl group, are straight or branched chain hydrocarbon groups of up to seven carbon atoms such as methyl, ethyl, propyl, isopropyl, butyl or the like. The lower alkoxy groups are similar oxygen containing groups, such as methoxy, ethoxy, propoxy, isopropoxy or the like.

The cyclo-lower alkyl groups are three to six carbon cyclo-aliphatic groups including cyclopropyl, cyclobutyl, cyclopentyl and cyclohexyl. The halogens are the four common halogens, but chlorine and bromine are preferred.

Preferred within the lower alkyl and lower alkoxy groups are those with one to three carbon atoms and preferred cyclo-lower alkyl groups are the 5 and 6 carbon members.

Preferred $R_1$ members are hydrogen and lower alkoxy, especially methoxy. Preferred $R_2$ members are hydrogen, lower alkyl (especially 1 to 3 carbons), cyclo-lower alkyl (especially 5 to 6 carbons), phenyl and p-lower alkoxyphenyl (especially p-methoxyphenyl). Preferred for $R_3$ is hydrogen.

DETAILED DESCRIPTION OF THE INVENTION

The compounds of formula I are produced by cyclizing an N-(hydroxyamidino)-2-phenylacetamide, or an acid salt thereof, e.g., a hydrohalide like the hydrochloride, of the formula (II) 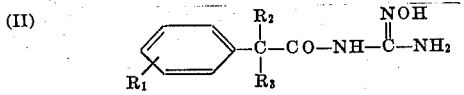

in the presence of a base, e. g., an alkali metal hydroxide, like sodium hydroxide, potassium hydroxide or the like, in an aqueous medium, preferably at a reduced temperature, e.g., at about 0° to 5° C.

The compounds of formula II may be derived from the unsubstituted or appropriately substituted phenylacetic halide, preferably chloride, of the formula (III) 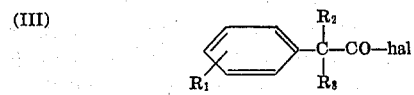

by reaction with cyanamide, for example, by adding the phenylacetic halide to the cyanamide at a reduced temperature, e.g., below about 5° C. in alkaline solution.

The $R_2,R_3$-phenylacetyl halides are produced from the appropriate phenylacetic acid and thionyl chloride.

The resulting phenylacetyl cyanamide of the formula (IV) 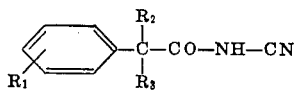

is treated with hydroxylamine, or an acid salt thereof, e.g., a hydrohalide like the hydrochloride, in the presence of a hydrogen halide acceptor like pyridine or other base to obtain the compound of formula II.

The new compounds of this invention have anti-inflammatory properties and are useful as anti-inflammatory agents, for example, to reduce local inflammatory conditions such as those of an edematous nature or resulting from proliferation of connective tissue in various mammalian species such as rats, dogs and the like when given orally in dosages of about 5 to 50 mg/kg/day, preferably 5 to 25 mg/kg/day, in single or 2 to 4 divided doses, as indicated by the carageenan edema assay in rats. The active substance may be utilized in compositions such as tablets, capsules, solutions or suspensions containing up to about 300 mg. per unit of dosage of a compound or mixture of compounds of formula I. They may be compounded in conventional manner with a physiologically acceptable vehicle or carrier, excipient, binder, preservative, stabilizer, flavor, etc. as called for by accepted pharmaceutical practice. Topical preparations containing about 0.01 to 3 percent by weight of active substance in a lotion, salve or cream may also be used.

The following examples are illustrative of the invention. It will be appreciated variously substituted phenylacetyl halides of formula III or their derivatives of formulas II and IV may be used in the same manner as in the following examples to obtain other compounds of this invention in addition to the illustrative members which follow. All temperatures are on the centigrade scale.

EXAMPLE 1

3-Amino-5-Benzyl-1,2,4-Oxadiazole 56 g. (0.8 mol.) of hydroxylamine hydrochloride are dissolved in 250 ml. of pyridine and 85 g. (0.53 mol.) of phenylacetyl cyanamide (produced from phenylacetyl chloride and cyanamide under the conditions of the Schotten-Baumann reaction) are added gradually with stirring. The reaction temperature is regulated by cooling so as not to exceed 40° C. The reaction mixture is then permitted to stand overnight, diluted with water and 30 percent sodium hydroxide solution is added until there is a definite excess of alkali. The mixture is stirred until crystals begin to precipitate, cooled to 0° to 5° and permitted to stand at this temperature for several hours. The yield amounts to 56.6 g. of 3-amino-5-benzyl-1,2,4-oxadiazole, m.p. 110°–113°.

EXAMPLE 2

3-Amino-5-(1-Phenylpropyl)-1,2,4-Oxadiazole 258 g. of 2-phenylbutyryl chloride dissolved in 500 ml. of acetone and sodium hydroxide solution are added simultaneously dropwise at a temperature of 0° to 5° to a mixture of 60 g. of cyanamide, 136 ml. of 30 percent sodium hydroxide solution and 1.35 liters of water. The pH is continually controlled so as not to go below 10 to 11. The mixture is stirred for 1 hour and the clear solution is then made strongly acid with concentrated hydrochloric acid, while holding the temperature below 5°.

The oil which precipitates is taken up in chloroform, separated from water, the chloroform solution is dried with magnesium sulfate and the solvent is then evaporated. 269 g. of crude 2-phenylbutyroyl cyanamide remain, which, without further purification, are dissolved in 860 ml. of ethanol. This solution is added to a solution of 151 g. of hydroxyl-amine hydrochloride in 345 ml. of pyridine. The reaction proceeds exothermically. While cooling externally, care is taken that the temperature does not exceed 40°.

The reaction mixture is permitted to stand overnight at room temperature, the solution is then concentrated and treated with sufficient 2N sodium hydroxide solution so that the solution reacts strongly basic. 3-Amino-5-(1-phenylpropyl)-1,2,4-oxadiazole precipitates. The product is recrystallized from about 300 ml. of ethanol to obtain 138 g. melting at 99°–100°.

The following additional compounds of formula I are produced according to the procedure of Example 2 by substituting for the 2-phenylbutyryl chloride of that Example the phenyl-acetyl chloride having the same substitutents $R_1$, $R_2$ and $R_3$ as those in the final products below:

wherein $R_1$ is hydrogen, chlorine, bromine, lower alkyl or lower alkoxy; $R_2$ is hydrogen, lower alkyl, cyclo-lower alkyl, phenyl, lower alkyl-phenyl or lower alkoxyphenyl; and $R_3$ is hydrogen, lower alkyl, phenyl, lower alkylphenyl or lower alkoxyphenyl.

2. A compound as in claim 1 wherein $R_1$ and $R_3$ each is hydrogen and $R_2$ is lower alkyl.

3. A compound as in claim 1 wherein $R_1$ is hydrogen and $R_2$ and $R_3$ each is lower alkyl.

4. A compound as in claim 1 wherein $R_1$ and $R_3$ each is hydrogen and $R_2$ is cyclo-lower alkyl.

5. A compound as in claim 1 wherein $R_1$ is lower alkoxy, $R_2$ is phenyl or lower alkoxyphenyl and $R_3$ is hydrogen.

6. A compound as in claim 1 wherein $R_1$, $R_2$ and $R_3$ each is hydrogen.

7. A compound as in claim 2 wherein the lower alkyl group is ethyl.

8. A compound as in claim 2 wherein the lower alkyl group is propyl.

9. A compound as in claim 4 wherein the cyclo-alkyl group is cyclopentyl.

10. A compound as in claim 4 wherein the cyclo-

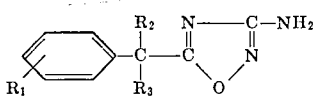

| Example | $R_1$ | $R_2$ | $R_3$ | M.P., degrees | Solvent of recrystallization |
|---|---|---|---|---|---|
| 3 | H | phenyl | H | 156–158 | Methanol. |
| 4 | H | —CH$_2$CH$_2$CH$_3$ | H | 89–91 | n-Heptane. |
| 5 | H | —CH(CH$_3$)$_2$ | H | 107–109 | Do. |
| 6 | H | cyclopentyl | H | 108–112 | Isopropanol. |
| 7 | H | cyclohexyl | H | 91–93 | Petroleum ether. |
| 8 | CH$_3$O | phenyl | H | 133–136 | Isopropanol. |
| 9 | CH$_3$O | phenyl-OCH$_3$ | H | 149–151 | Methanol. |
| 10 | CH$_3$O | cyclohexyl | H | 134–135 | Isopropanol. |
| 11 | H | phenyl | phenyl | 248–252 | Methylene glycol. |

What is claimed is:
1. A compound of the formula lower alkyl group is cyclohexyl.

11. A compound as in claim 5 wherein each lower alkoxy group is methoxy.

* * * * *